(12) United States Patent
Huang et al.

(10) Patent No.: US 11,314,104 B2
(45) Date of Patent: Apr. 26, 2022

(54) GLASSES ASSEMBLY WITH NOSE PAD FOR HIGH LOAD

(71) Applicant: JORJIN TECHNOLOGIES INC., New Taipei (TW)

(72) Inventors: Tzu-Hsiang Huang, New Taipei (TW); Chih-Chung Lin, New Taipei (TW); Chih-Hao Hsu, New Taipei (TW)

(73) Assignee: JORJIN TECHNOLOGIES INC., New Taipei (TW)

( * ) Notice: Subject to any disclaimer, the term of this patent is extended or adjusted under 35 U.S.C. 154(b) by 0 days.

(21) Appl. No.: 16/993,276

(22) Filed: Aug. 14, 2020

(65) Prior Publication Data

US 2022/0050306 A1   Feb. 17, 2022

(51) Int. Cl.
*G02C 5/12* (2006.01)

(52) U.S. Cl.
CPC .............. *G02C 5/12* (2013.01); *G02C 5/128* (2013.01)

(58) Field of Classification Search
CPC .......... G02C 5/12; G02C 5/122; G02C 5/124; G02C 5/126; G02C 5/128
USPC ................. 351/65, 71–76, 78, 80, 136–139
See application file for complete search history.

(56) References Cited

U.S. PATENT DOCUMENTS

| | | | | |
|---|---|---|---|---|
| 899,409 | A * | 9/1908 | Kampfe | G02C 5/02 351/65 |
| 2,243,770 | A * | 5/1941 | Nerney | G02C 5/12 351/129 |
| 7,648,235 | B1 * | 1/2010 | Rosenfeld | G02C 5/02 351/131 |
| 2001/0048504 | A1 * | 12/2001 | Joo | G02C 5/12 351/136 |
| 2019/0302484 | A1 * | 10/2019 | Zhang | G06F 1/163 |

FOREIGN PATENT DOCUMENTS

WO    WO-2011148309 A1 * 12/2011 ............... A61F 5/08

* cited by examiner

*Primary Examiner* — Darryl J Collins
(74) *Attorney, Agent, or Firm* — Leong C. Lei

(57) ABSTRACT

A glasses assembly with a nose pad for high load includes: a pair of glasses, configured with an accommodation portion, where the glasses are smart glasses; a support, configured with a first fixing portion, at least one second fixing portion, and the first fixing portion inserted in the accommodation portion of the glasses; and a flat nose pad, two sides thereof respectively configured with a fixed portion, each of the fixed portions installed on the second fixing portion of the support. With the flat nose pad being worn on the user's nose bridge to form a fulcrum, the glasses, smart glasses can achieve leverage balance through the flat nose pad, and the flat nose pad can buffer the weight of the glasses, smart glasses, capable of significantly reducing the user's discomfort after wearing them for a long time, and preventing them from slipping downward.

6 Claims, 8 Drawing Sheets

GLASSES ASSEMBLY WITH NOSE PAD FOR HIGH LOAD

(a) TECHNICAL FIELD OF THE INVENTION

The present invention relates to a glasses nose pad, and more particularly to a glasses assembly with a nose pad for high load.

(b) DESCRIPTION OF THE PRIOR ART

A general glasses nose pad, as disclosed in Taiwan Patent No. 590697, is placed both sides of the root of nose, thereby supporting the glasses. Although a general glasses nose pad can be placed on the both sides of the root of a nose to support the glasses, thereby preventing them from slipping downward. However, when a user wears glasses for a long time or the glasses are too heavy, it will make the two sides of the root of the nose unable to play the leverage effect due to the non-leverage correct support point. Moreover, it is not the right lever balance point which can support the high load, which leads to the discomfort of the root of the nose after being squeezed by the nose pad for a long time. In addition, the dents also make the users feel uncomfortable.

SUMMARY OF THE INVENTION

To overcome the above disadvantages, the present invention is to provide a glasses assembly with a nose pad for high load.

A glasses assembly with a nose pad for high load of the present invention includes: a pair of glasses, configured with an accommodation portion, where the accommodation portion is a hole; a support, configured with a first fixing portion, at least one second fixing portion, and the first fixing portion inserted in the accommodation portion of the glasses, where the second fixing portion is formed a bended angle or non-bended angle with the support; and a flat nose pad, two sides thereof respectively configured with a fixed portion, each of the fixed portions installed on the second fixing portion of the support, and the flat nose pad being not parallel to the support, where the two sides of the flat nose pad are respectively configured with a bend portion.

With the first fixing portion of the support being inserted in the accommodation portion of the glasses, and the second fixing portions of the support being combined with the fixed portions of the flat nose pad allow the flat nose pad to be pressed against a nose bridge of a user when the user wears the glasses or smart glasses. With the flat nose pad being pressed against the user's nose bridge to form a fulcrum, the glasses, smart glasses can achieve leverage balance through the flat nose pad, and the flat nose pad can buffer the weight of the glasses, smart glasses, capable of significantly reducing the user's discomfort after wearing them for a long time, and preventing them from slipping downward.

In addition, the bend portions of the flat nose pad of the present invention may also be bended, and the bended bend portions of the flat nose pad can be more easily combined with the support. At the same time, the flat nose pad of the present invention falls on the correct lever fulcrum of the nose bridge upon implementation. Whereby, when the flat nose pad is used on the glasses, smart glasses with heavier weight (for example, large-frame glasses with glass lenses, smart glasses with many functional modules), the support force of the flat nose pad and support can be increased, and the discomfort felt due to the heavier weight can be reduced.

DETAILED DESCRIPTION OF THE PREFERRED EMBODIMENTS

Figure 1:
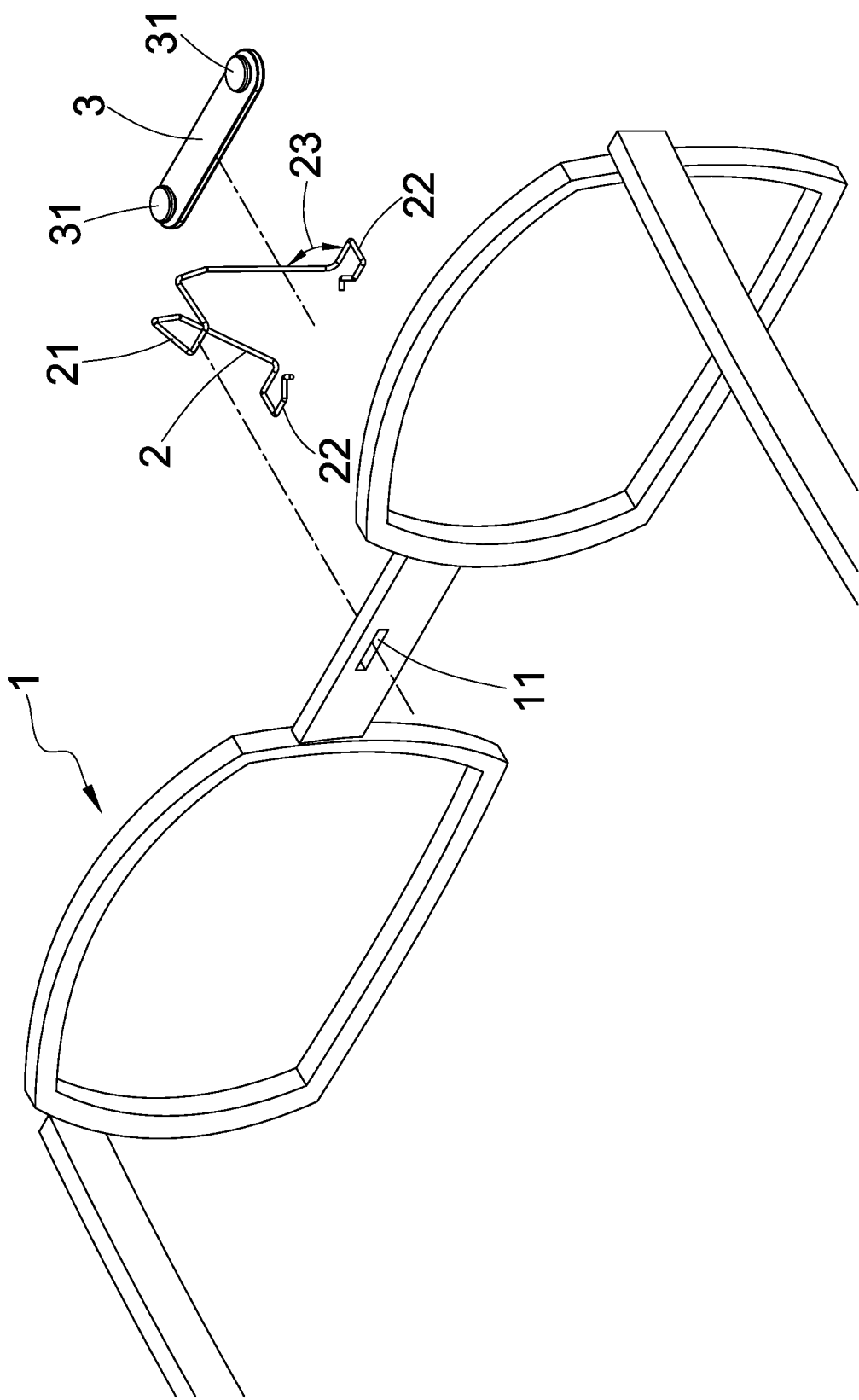
FIG. 1 is an exploded view of the present invention.
Figure 3:
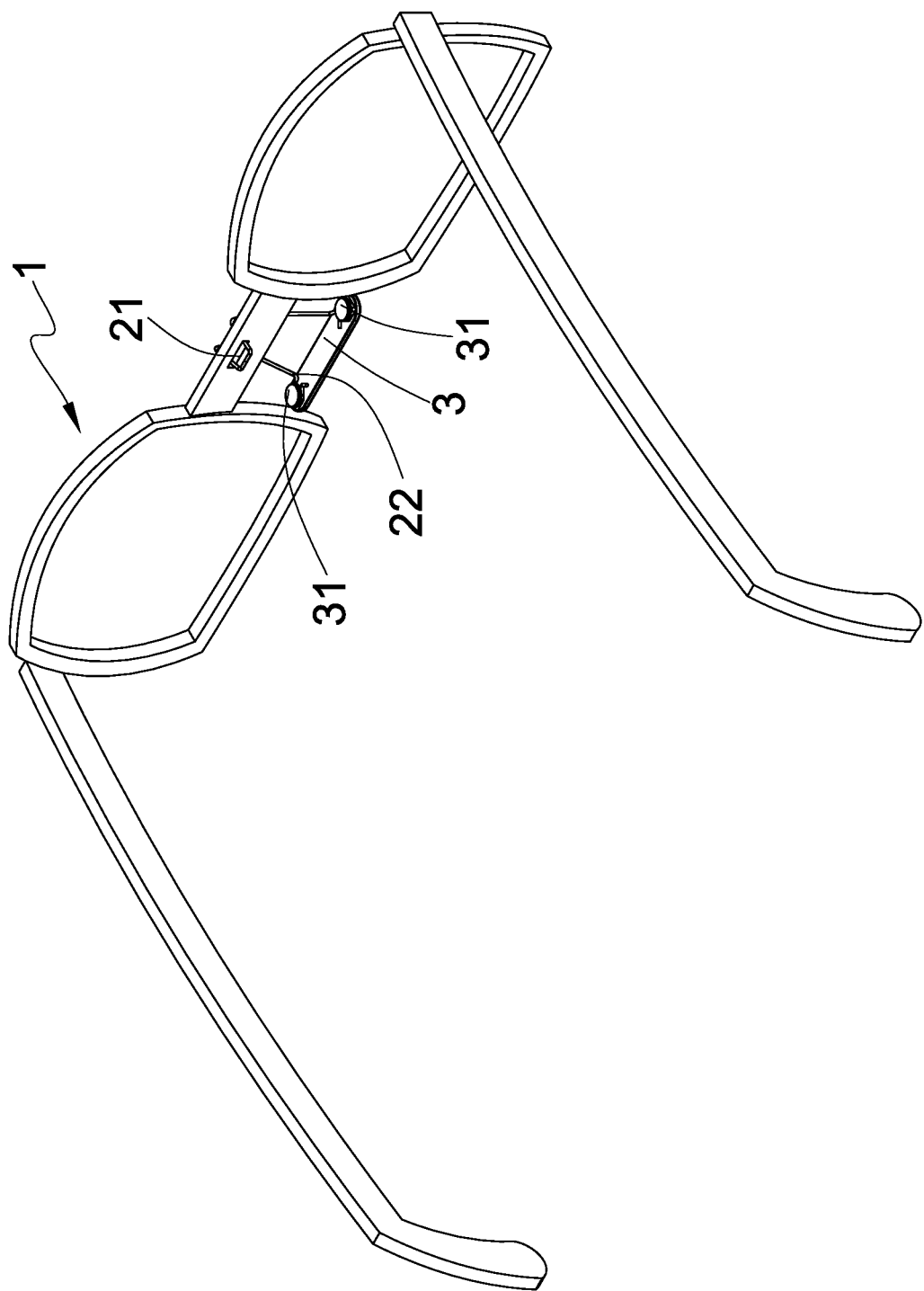
FIG. 3 is a perspective view of the present invention.

Referring to FIGS. 1 and 3, a glasses assembly with a nose pad for high load of the present invention includes a pair of glasses 1, support 2, and flat nose pad 3.

Figure 4:
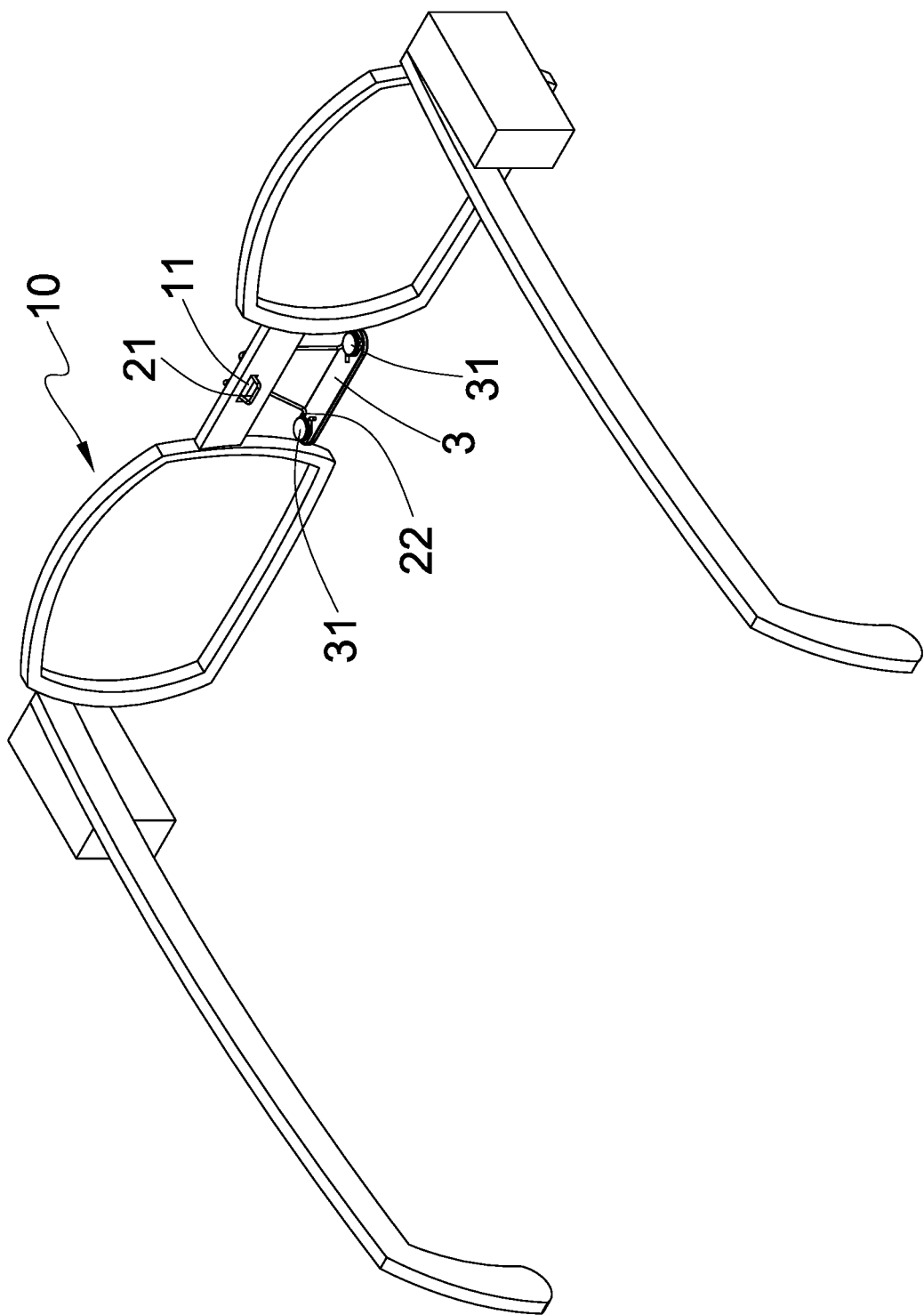
FIG. 4 is a perspective view of the present invention, where the glasses is smart glasses.

The pair of glasses 1 is configured with an accommodation portion 11, and may be a pair of smart glasses 10, as FIG. 4 shows; the accommodation portion 11 is a hole.

Figure 8:
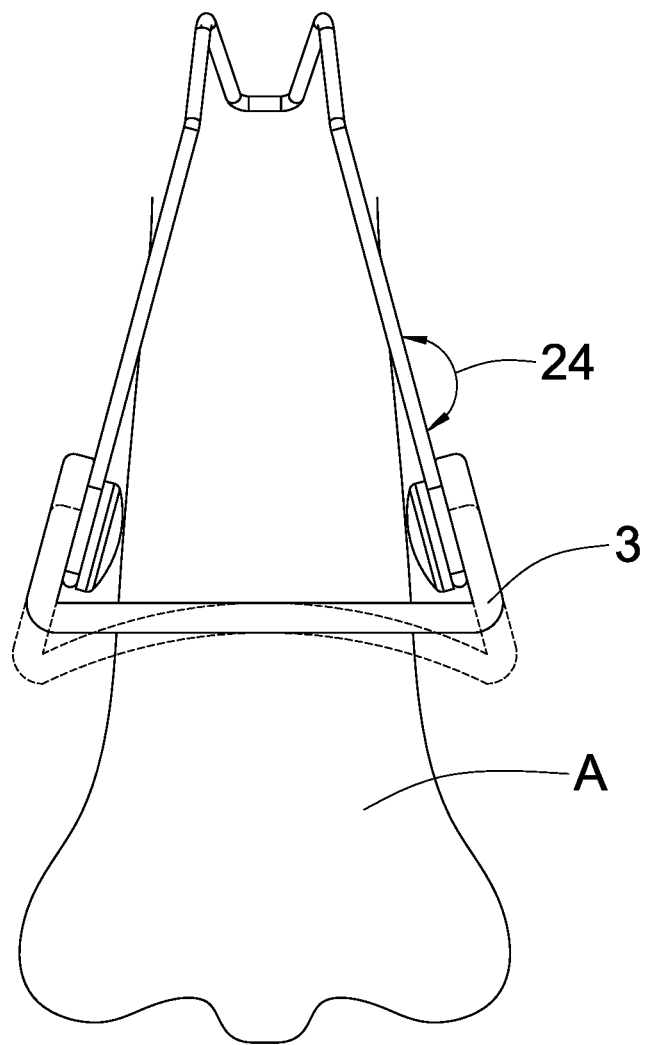
FIG. 8 is a schematic view of the present invention, where the bended flat nose pad is used as a buffer.

The support 2 is configured with a first fixing portion 21, and at least one second fixing portions 22, where the first fixing 21 of the support 2 is inserted in the accommodation portion 11 of the glasses 1, where the second fixing portion 22 is formed a bended angle 23 as FIG. 1 shows, or a non-bended angle 24 (180 degrees) as FIG. 8 shows with the support 2.

Figure 2:
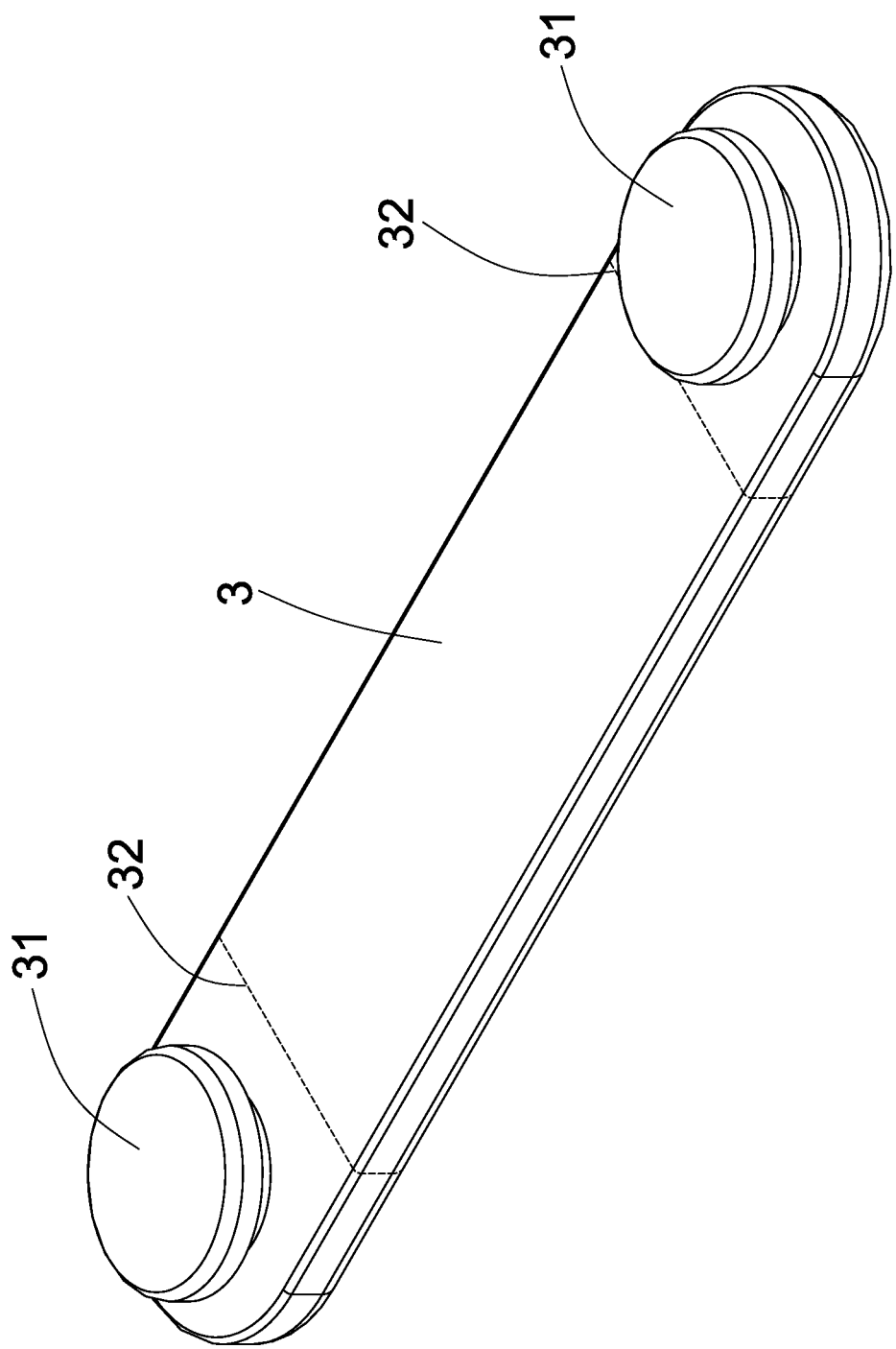
FIG. 2 is a schematically perspective of a flat nose pad of the present invention.

Referring to FIGS. 1 and 2, the two sides of the flat nose pad 3 are respectively configured with a fixed portion 31, and each of the fixed portions 31 is positioned on the second fixing portion 22 of the support 2. Furthermore, the flat nose pad 3 is not parallel to the support 2, and both sides thereof are respectively configured with a bend portion 32.

Figure 5:
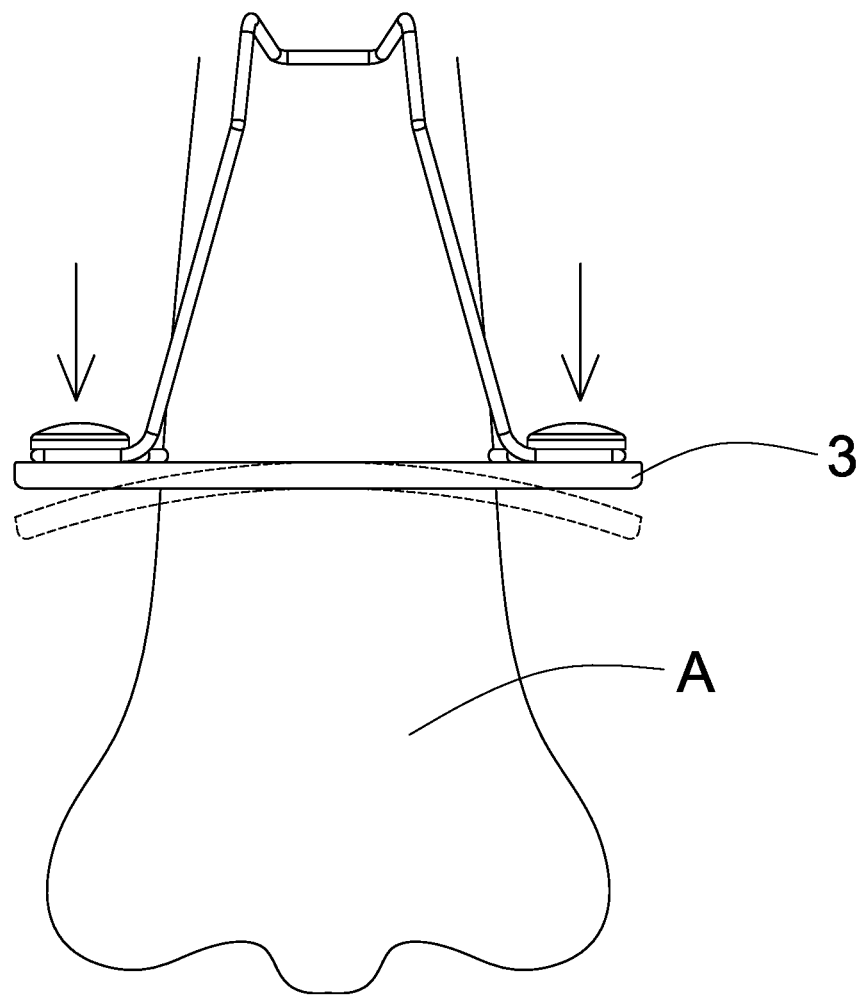
FIG. 5 is a schematic view of the flat nose pad of the present invention used as a buffer.

Referring to FIG. 1, with the first fixing portion 21 of the support 2 being inserted in the accommodation portion 11 of the glasses 1, and the second fixing portions 22 of the support 2 being combined with the fixed portions 31 of the flat nose pad 3 allow the flat nose pad 3 to be pressed against a nose bridge A of a user as FIG. 5 shows when the user wears the glasses 1 as FIG. 1 shows or smart glasses 10 as FIG. 4 shows. With the flat nose pad 3 being pressed against the user's nose bridge A to form a fulcrum, the glasses 1, smart glasses 10 can achieve leverage balance through the flat nose pad 3, and the flat nose pad 3 can buffer the weight of the glasses 1, smart glasses 10, capable of significantly reducing the user's discomfort after wearing them for a long time, and preventing them from slipping downward.

Figure 6:
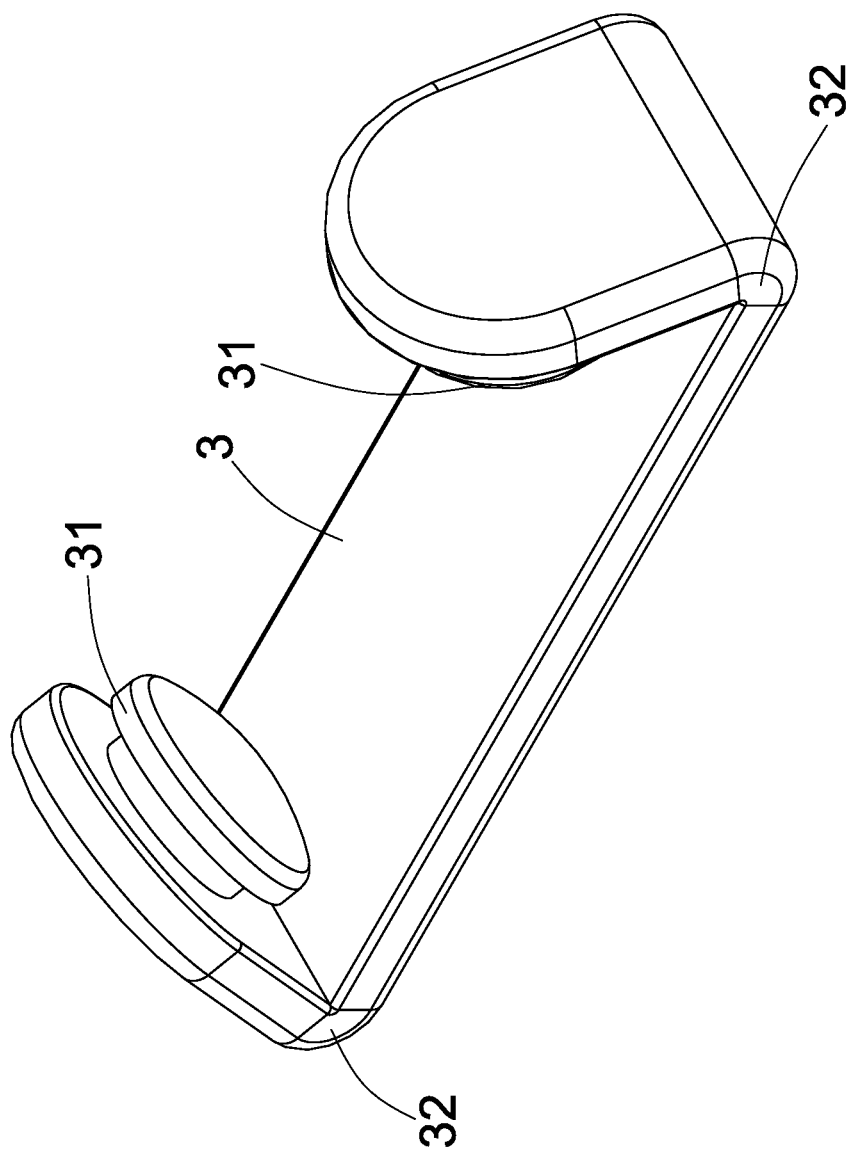
FIG. 6 is a perspective view of the flat nose pad of the present invention when being bended.
Figure 7:
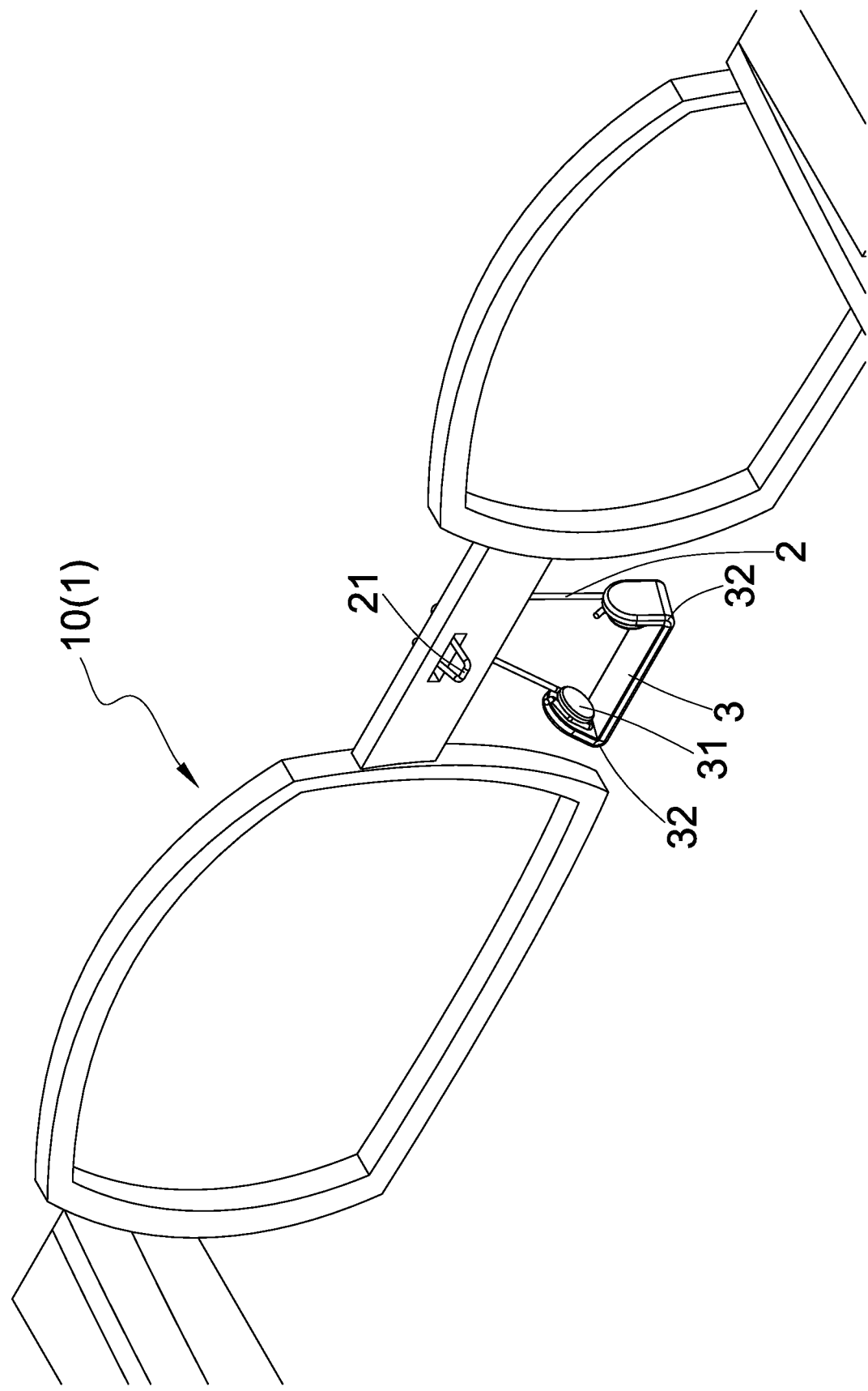
FIG. 7 is a perspective view of the present invention with the bended flat nose pad.

Referring to FIG. 6, the bend portions 32 of the flat nose pad 3 of the present invention may also be bended, and the bended bend portions 32 of the flat nose pad 3 can be more easily combined with the support 2. At the same time, the flat nose pad 3 of the present invention falls on the correct lever fulcrum of the nose bridge A upon implementation. Whereby, when the flat nose pad 3 is used on the glasses 1, smart glasses 10 with heavier weight (for example, large-frame glasses with glass lenses, smart glasses with many functional modules), the support force of the flat nose pad 3 and support 2 can be increased, and the discomfort felt due to the heavier weight can be reduced.

We claim:

1. A glasses assembly with a nose pad for high load, comprising:
   a pair of glasses, configured with an accommodation portion;
   a support, configured with a first fixing portion, at least one second fixing portion, and said first fixing portion inserted in said accommodation portion of said glasses; and
   a flat nose pad, two sides thereof respectively configured with a fixed portion, each of said fixed portions installed on said second fixing portion of said support, and said flat nose pad being not parallel to said support;
   wherein said second fixing portion is formed a bended angle with said support.

2. The assembly according to claim 1, wherein said glasses are smart glasses.

3. The assembly according to claim 1, wherein two sides of said flat nose pad are respectively configured with a bend portion.

4. The assembly according to claim 1, wherein said accommodation portion is a hole.

5. A glasses assembly with a nose pad for high load, comprising:
   a pair of glasses, configured with an accommodation portion;
   a support, configured with a first fixing portion, at least one second fixing portion, and said first fixing portion inserted in said accommodation portion of said glasses; and
   a flat nose pad, two sides thereof respectively configured with a fixed portion, each of said fixed portions installed on said second fixing portion of said support, and said flat nose pad being not parallel to said support;
   wherein said second fixing portion is formed a non-bended angle with said support.

6. The assembly according to claim 5, wherein said accommodation portion is a hole.

* * * * *